United States Patent

[11] 3,575,235

| [72] | Inventors | Noel Davis<br>Russell Township;<br>Thomas F. Vandenberg, Moreland Hills, Ohio |
|---|---|---|
| [21] | Appl. No. | 856,727 |
| [22] | Filed | Sept. 10, 1969 |
| [45] | Patented | Apr. 20, 1971 |
| [73] | Assignee | Integrated Development and Manufacturing Co.<br>Chagrin Falls, Ohio |

[54] ENVIRONMENTAL GROWTH CHAMBER
11 Claims, 4 Drawing Figs.

[52] U.S. Cl. ................................................ 165/2, 165/48, 98/33, 98/40, 47/17
[51] Int. Cl. .................................................. A01g 9/00
[50] Field of Search ........................................... 98/40, 40 (C), 40 (D), 37, 33; 165/1, 2, 60, 48; 47/17

[56] References Cited
UNITED STATES PATENTS

| 2,473,589 | 6/1949 | Johnson | 47/17UX |
| 3,124,903 | 3/1964 | Truhan | 47/17 |
| 3,424,231 | 1/1969 | Truhan | 165/60X |
| 3,434,530 | 3/1969 | Davis | 165/60 |

FOREIGN PATENTS

| 1,272,260 | 8/1961 | France | 47/17 |

Primary Examiner—Martin P. Schwadron
Assistant Examiner—P. D. Ferguson
Attorney—Meyer, Tilberry and Body ABSTRACT: A method and apparatus for assuring uniform, continuous air flow through a growth chamber by supplying the air to the chamber in separate paths to produce an interwoven rotary air flow through the chamber.

PATENTED APR 20 1971

INVENTORS
NOEL DAVIS
THOMAS VAN DENBERG
BY
*Meyer, Tilberry & Body*
ATTORNEYS.

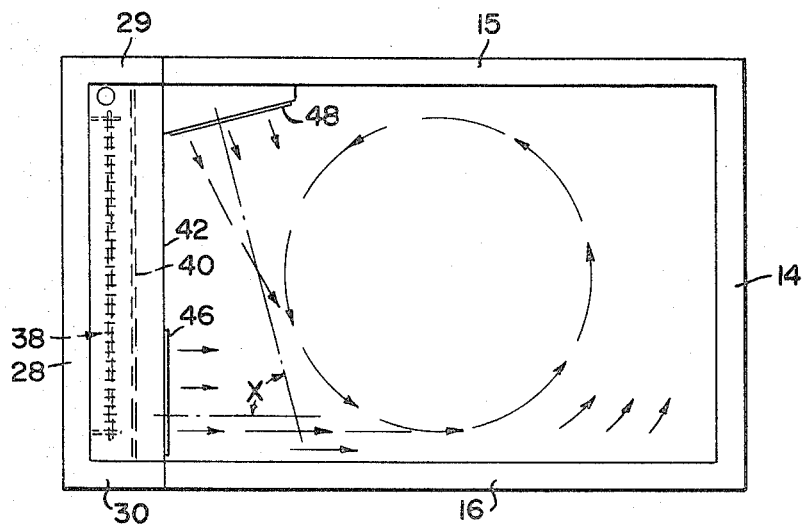
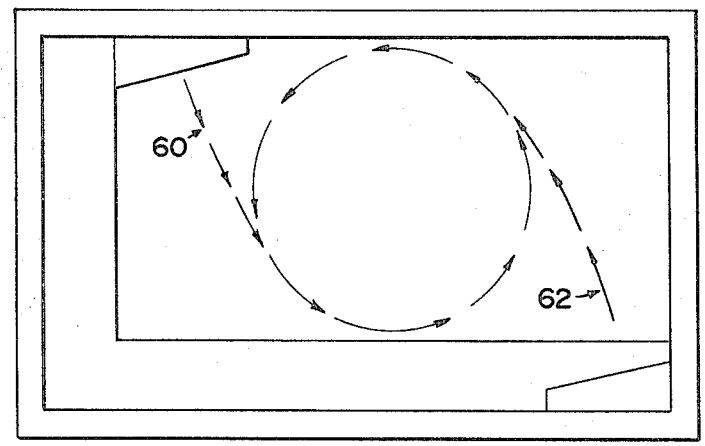
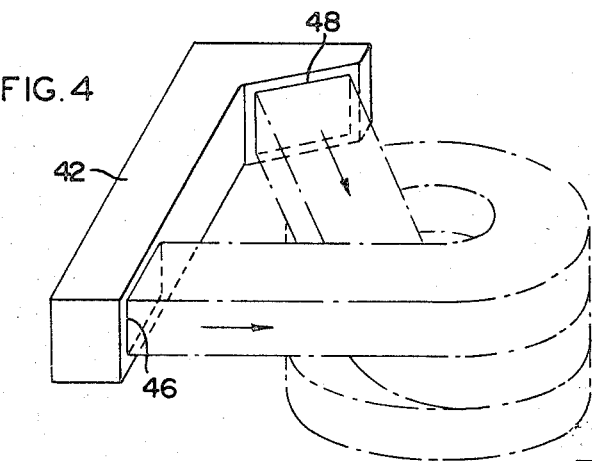

ENVIRONMENTAL GROWTH CHAMBER

The present invention is directed toward the art of environmental growth control chambers and, more particularly, to a method and apparatus for circulating conditioned air through the chambers in a manner which prevents temperature level variations at points at the same elevation transversely of the chamber while assuring uniform air velocity averages at all such points.

The invention is especially suited for use in the smaller, reach-in-type chambers and will be described with particular reference thereto; however, it will be appreciated the invention is capable of broader application and could be utilized in chambers of substantially any size.

In environmental growth chambers it is extremely important that temperature, humidity, airflow and light intensity be closely maintained at predetermined levels for extended periods of time. Additionally, these environmental variables must preferably be constant at all points within a specified test area, generally considered in terms of all the space a certain minimum distance from any wall. For example, when the chambers are utilized for conducting experiments on plant growth, the plants are normally supported at various horizontal levels transversely of the chamber. As can readily be appreciated, the environmental variables at all points at this level must be as close to the same as possible. Otherwise different plants will be subjected to different conditions and the test results will not be entirely satisfactory.

In the larger, walk-in-type chambers, it is possible to satisfy the above conditions by utilizing condition modifying units of the type disclosed in U.S. Pat. No. 3,434,530, issued Mar. 25, 1969 for "Environmental Growth Chamber Construction." By properly positioning the units along one or more interior walls of the chambers, extremely uniform average vertical airflow can be achieved, as well as, uniform temperature and humidity conditions at points of common elevation within a wide band of horizontal test levels. Although generally similar results can be achieved using the same approach in the smaller reach-in-type chambers, difficulties are encountered. First, in the larger chambers, because of their correspondingly greater heat loss or gain, it is possible to economically provide two or more condition modifying units and achieve more uniform airflow through the chambers by proper positioning of the units. In the smaller chambers however, it is not economical to provide plural conditioning units because of the chambers relatively lesser heat gain or loss. Consequently, the units required would be comparatively small and, as such, substantially more expensive to build and operate considering their actual capacity. Secondly, although in larger chambers it may be possible to obtain relatively uniform airflow with only a single unit, problems are experienced in the smaller chambers with this approach. These problems result because it is very difficult to obtain the usual air supply flow patterns in the smaller chambers with single conditioning units at all points in the growth zone. Then, as a result of nonuniform airflow, small, but undesirable, temperature and humidity variations are present across the chamber. Additionally, when the chambers are utilized for tests on plants, the air velocity through the test zone must be relatively uniform and, preferably, in a range of approximately 80—125 f.p.m. Any excesses in velocity results in plant "leaf flutter" which can also be detrimental to test results.

The above factors have made it difficult to economically build and operate small size growth chambers having the ability to provide the exactness desired in environmental control. The present invention however, provides a method and apparatus for supplying conditioned air to environmental growth chambers in a manner which produces extremely uniform airflow through the test zone and, accordingly, more uniform temperature and humidity conditions. By utilizing the invention, airflow uniformity previously obtainable only with plural conditioning units or complex duct systems can be achieved simply and economically with the use of only a single conditioning unit. Additionally, if desired, the invention can be carried out with a plurality of conditioning units. This is, at times, advantageous in the larger size chambers.

In accordance with a first aspect of the invention there is provided an improved method of circulating conditioned air through an environmental growth chamber of the type defining a generally horizontally extending test zone and comprising a housing including condition modifying means for maintaining the air in the housing at predetermined conditions of temperature and humidity. The method comprises the steps of: (a) continuously withdrawing air from the chamber at a first elevation vertically spaced from the test zone; (b) continuously passing the withdrawn air through the condition modifying means and, thereafter, conducting it to a second elevation vertically spaced from the test zone on the side opposite the point from which it was withdrawn; and, (c) readmitting the conditioned air to the chamber at said second elevation in at least two horizontal streams directed to provide interwoven rotation of the air streams in the chamber as they passed from the second elevation to the first elevation.

In accordance with a more limited aspect of the invention the quantity of air withdrawn and reintroduced is sufficient to maintain an average airflow velocity in the range above 80 f.p.m. through the test zone.

In accordance with another aspect of the invention, an environmental growth chamber of the type having a housing defining a closed chamber and providing a horizontal test zone and including condition modifying means for maintaining predetermined conditions of temperature and humidity in said chamber is provided with improved means for maintaining a continuous uniformly distributed flow of conditioned air through the test zone. The improved means include first means for continuously withdrawing a predetermined quantity of air from the chamber at a first elevation vertically spaced from the test zone, second means for conducting the quantity of air through the condition modifying means; and, third means for conducting the air from the condition modifying means to a second elevation vertically spaced from the test zone on the side opposite the first elevation, the third means further includes means for supplying the air back to the chamber in at least two generally horizontally intersecting streams to cause the air to rotate as it moves through the chamber from the second elevation to the first elevation.

Accordingly, a primary object of the invention is the provision of an improved method and apparatus for providing improved airflow in an environmental growth chamber.

Another object of the invention is to provide a method and apparatus for producing a uniform interwoven rotary airflow in an environmental growth chamber.

Still another object is the provision of a method of circulating air through an environmental growth chamber which provides extremely uniform airflow through the chamber test zone even in the airflow chambers.

Yet another object is the provision of apparatus for providing continuous uniform airflow in a predetermined velocity range through the test zone of growth chambers.

An additional object is the provision of method and apparatus for assuring uniform environmental conditions at all points within the test zone.

These and other objects and advantages will become apparent from the following description when read in conjunction with the accompanying drawings wherein:

FIG. 2 is a cross-sectional view taken on line 2–2 of FIG. 1 showing the airflow pattern produced according to the invention;

FIG. 3 is a modification of air inlet arrangements which will produce vertical airflow similar to that of the FIGS. 1 and 2 embodiment; and, FIG. 4 is a schematic showing of the airflow in the FIG. 1 embodiment.

Figure 1:
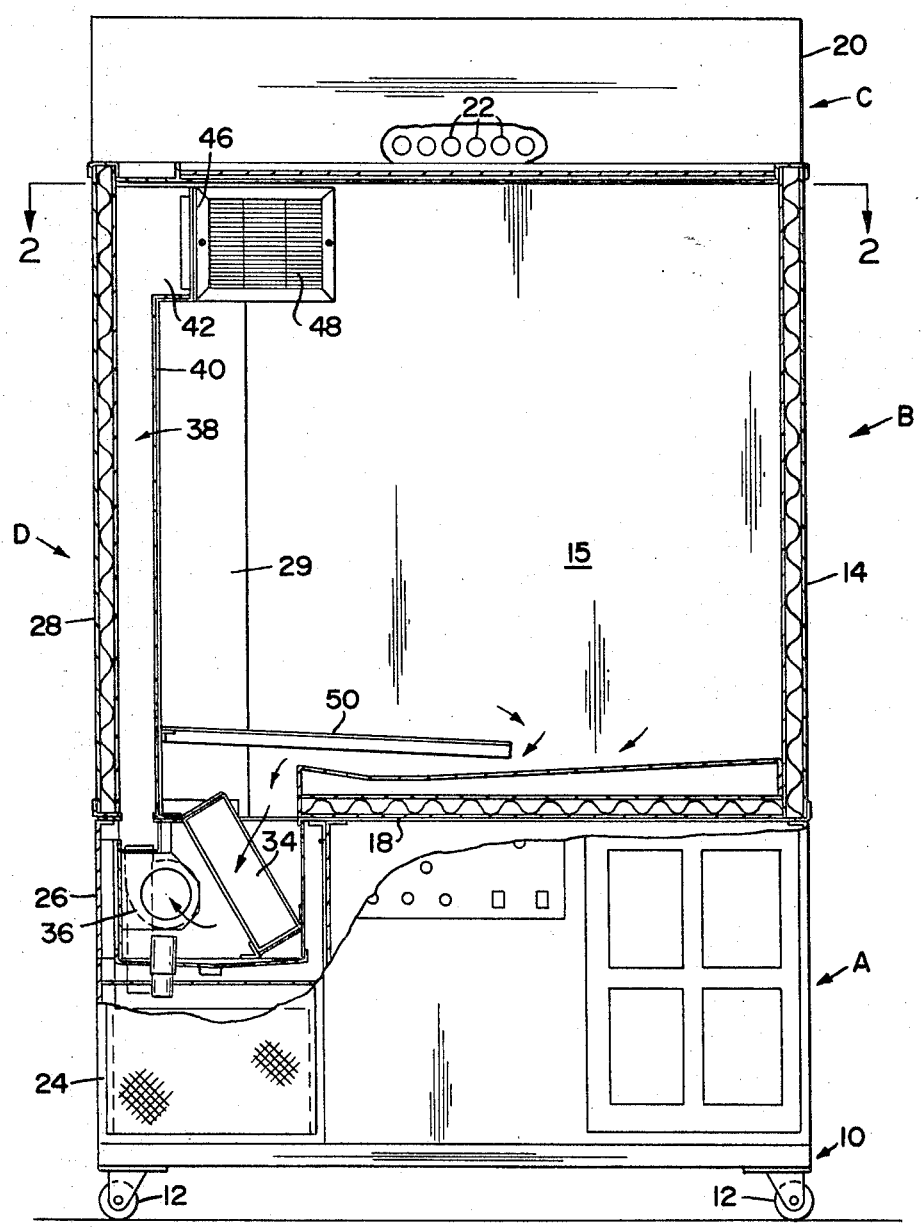
FIG. 1 is an elevational view, partially in section, showing a reach-in-type growth chamber unit constructed in accordance with a preferred embodiment of the invention.

Referring more specifically to the drawings which are for the purpose of showing a preferred embodiment of the invention only and not for the purpose of limiting same, FIG. 1 shows an elevational view of a portable, reach-in-type growth chamber comprised of a control module A an insulated chamber module B, a light cap module C and a temperature humidity and airflow regulating module D. Each of the modules are relatively self-contained and arranged to interfit to provide a compact, rectangular unit. As shown, the modules are all supported from a base frame 10 formed, for example, from angle iron and provided with heavy duty casters 12.

The modular construction is not of particular importance to the invention, however it is preferred for reasons of ease of maintenance, tec. Specifically, the control module A is formed in conventional manner from aluminum sheet and angle stock and houses the majority of the electrical controls, recorders, and other devices required for proper monitoring and control, module A is supported directly from base frame 10 and, in turn, supports the major portion of the chamber module B.

Chamber module B provides the actual test chamber and includes three vertically extending sidewalls 14, 15 and 16 (See FIG. 2) which are preferably well insulated. In the preferred embodiment, the walls are formed from a sandwich construction of plastic foam and aluminum sheet. As seen in FIG. 1, a horizontal lower wall 18 extends between the sidewalls and over the control module A. The left side of the chamber module B is closed and insulated by the regulating module D whereas the open top is sealed by the light cap module C.

The high intensity light necessary for test with the chamber is provided by cap module C. This module could be of a variety of constructions but is shown as rectangular, sheet metal housing 20 arranged to fit on, and be supported by, the module B. A large number of electrical lamps, for example closely spaced fluorescent tubes 22, are mounted in housing 20. The lamp chamber of the housing is preferably insulated from the interior of the test chamber by a sheet of "plexiglas" or similar light pervious material.

The environmental conditions of temperature, humidity and airflow within the test chamber are regulated by the apparatus contained in module D. As shown, this module includes a lower sheet metal housing 24 which extends across the width of the unit. Housing 24 contains the necessary refrigeration compressor and other power elements required. Mounted immediately above housing 24 is a second housing 26 which extends across the unit at a level corresponding to wall 18. The top of housing 26 is open and joins the vertically extending walls 28, 29 and 30. These walls are preferably heavily insulated and formed in the same manner as walls 14—16. As best shown in FIG. 6, walls 29 and 30 are arranged to connect with walls 15 and 16 respectively and completely enclose the chamber. Normally, the joints between the respective walls are sealed such as by high density foam strip.

A refrigerating coil 34 is positioned within housing 22 and extends completely thereacross. The coil 34 can be of many types but is shown as a standard finned coil unit. The coil is positioned and baffled so that all the air withdrawn from the chamber must pass therethrough in the direction shown by the arrows.

Airflow through the chamber is produced by a pair of continuously operated double blower units 36 mounted in housing 22. The air output from blower units 36 is conducted to a second higher elevation within the chamber by a duct 38 formed by a plate or sheet member 40 which extends transversely between walls 29 and 30. The usual heaters and humidifying apparatus are provided in duct 38 and arranged to be traversed by the air passing therethrough.

As shown in FIG. 2, the upper end of duct 38 connects with a transversely extending plenum 42 from which the conditioned air is supplied back to the chamber. In its broader aspects, this general arrangement of continuous recirculation is relatively conventional. The particular feature of the invention which is of prime importance is the arrangement whereby an extremely uniform airflow is achieved through the central portion of the chamber, i.e., the test zone or area where the experiments are carried out.

As previously discussed, uniform airflow through the test zone, as well as close control of the heating, cooling or humidifying of the air, is necessary to ensure that all points within the test zone are at nearly the same conditions. For example, should the airflow be nonuniform across the chamber temperature differences will be experienced which reflect the varying airflow. Although relatively uniform airflow can be achieved by complex duct and baffle arrangements, or by substantially multiplying the number of air supply outlets, these solutions are somewhat unsatisfactory, especially in the smaller size growth chambers.

In accordance with the present invention, uniform airflow downwardly through the test zone is achieved by supplying the conditioned air to the chamber in at least two separate, generally horizontally directed streams arranged to induce an interwoven rotary flow or movement of the upper air mass within the chamber. The combination of withdrawal at one end of the chamber, coupled with the rotational supply at the other end assures that at least throughout the middle three-fourths of the chamber the airflow will be uniform. The reasons for the uniformity are believed in part, to result from the following factors: first, the interwoven rotary flow of air in the chamber caused, by centrifugal force, a substantial amount of air to be thrown outwardly to prevent stagnation in airflow along the chamber walls; secondly, each particle of air traveling through the chamber must traverse a longer path than is the case with a more direct vertical flow; thirdly, the longer airflow path coupled with the fact that as the air flows through the test zone it has a substantial horizontal component of motion prevents any vertical paths through the test zone from being stagnant; and, fourthly the interwoven rotary flow tends to produce a continuous mixing of the air so that temperature and humidity conditions are continuously being equalized as the air passes downwardly through the chamber.

The specific discharge air stream arrangement utilized for producing the interwoven rotary flow can be of many different layouts. One particular arrangement which has been found to be especially suitable is shown in FIGS. 2 and 4. As shown there, the plenum 42 is provided with two separate outlets 46 and 48. The outlets are provided with the airstream directing grills and are sized so that approximately one-half of the air will be discharged from each. Specifically, outlet 46 is formed directly in the forward end of plenum 42 (as viewed in FIG. 2) and its grill is arranged to direct the air generally parallel to wall 16. Outlet 48 however, is formed in a separate duct connected to the rear end of the plenum 42. Its outlet preferably directs the air so that the two streams meet in substantially overlapping relationship at an angle (See FIG. 4). That is, the airstreams from the outlets are in juxtaposed relationship with only a slight amount of impingement. Note that the end result is desirably approximately similar to a pair of interwound coils. The overlapping and impingement tends to cause an increase in the velocity of the slowest moving air particles in each stream i.e., the outer surfaces.

In addition to the above-described air inlet arrangement it has been found preferable to withdraw the air from centrally of the chamber. For this reason, a baffle plate 50 extends outwardly from member 40 (See FIG. 1) and transversely across the chamber between walls 15 and 16. As shown, the baffle terminates generally at the center of the chamber. This is believed to be advantageous because by withdrawing the air centrally of the chamber the interwoven rotary flow is not unduly affected except to an extent necessary to counteract slightly the possibility of a large portion of the airmass accumulating adjacent the sidewalls with a resultant reduced airflow vertically through the center of the chamber.

FIG. 3 shows an additional possible air inlet arrangement. In FIG. 3 the air is supplied in two generally parallel streams 60—62 each inclined at an angle relative to the opposite sidewall. Additionally, the outlets are arranged so that the streams are in overlapping, juxtaposed relationship as shown and discussed with reference to FIG. 4.

The invention has been described in great detail sufficient to enable one of ordinary skill in the art to make and use the same. Obviously, modifications and alterations of the preferred embodiment will occur to others upon a reading and understanding of the specification and it is my intention to include all such modifications and alterations insofar as they come within the scope of the appended claims.

We claim:

1. An improved method of circulating conditioned air through an environmental growth chamber of the type defining a generally horizontally extending test zone and including a housing provided with condition modifying means for maintaining the air in the housing at predetermined conditions of temperature and humidity, said method comprising the steps of (a) continuously withdrawing air from the chamber at a first elevation vertically spaced from the test zone; (b) continuously passing the withdrawn air through the condition modifying means and, thereafter, conducting it to a second elevation vertically spaced from the test zone on the side opposite the point from which it was withdrawn; and, (c) readmitting the conditioned air to the chamber at said second elevation in at least two horizontal streams arranged to produce a horizontal rotation of the air in the chamber as it passes from the second elevation to the first elevation.

2. The method as defined in claim 1 wherein said first elevation is below said second elevation.

3. The method as defined in claim 1 wherein said streams are directed to meet in nearly overlapping relationship angle of between 70° and 90°.

4. The method as defined in claim 1 wherein said streams are directed generally along adjacent walls of said chamber.

5. The method as defined in claim 1 wherein said streams are directed in generally parallel opposed relationship.

6. The method as defined in claim 1 wherein all of said air withdrawn at said first elevation is readmitted at said second elevation.

7. The method as defined in claim 1 wherein said streams are each of approximately equal cross section and velocity.

8. In an environmental growth chamber of the type having a housing defining a closed chamber providing a horizontal test zone and including condition modifying means for maintaining predetermined conditions of temperature and humidity in said chamber, the improvement comprising: first means for continuously withdrawing a predetermined quantity of air from the chamber at a first elevation vertically spaced from the test zone, second means for conducting the quantity of air through the condition modifying means; and, third means for conducting the air from the condition modifying means to a second elevation vertically spaced from the test zone on the side opposite the first elevation, the third means further including means for supplying the air back to the chamber in at least two generally horizontal streams arranged to impart a horizontal rotation to the air as it moves through the chamber from the second elevation to the first elevation.

9. Apparatus of claim 8 wherein said last mention means directs the air so that the streams are in overlapping relationship.

10. Apparatus of claim 8 wherein said last mention means directs the air in two parallel streams each inclined at an angle relative to an opposite sidewall of the chamber.

11. Apparatus of claim 10 wherein the last mentioned means directs the air so that the streams are in overlapping relationship.